US008374359B2

(12) United States Patent
Ickler et al.

(10) Patent No.: US 8,374,359 B2
(45) Date of Patent: Feb. 12, 2013

(54) KICK GATE

(75) Inventors: Christopher B. Ickler, Sudbury, MA (US); William R. Becker, Sudbury, MA (US); Hilmar Lehnert, Framingham, MA (US); Michael G. Zartarian, Boxborough, MA (US)

(73) Assignee: Bose Corporation, Framingham, MA (US)

( * ) Notice: Subject to any disclaimer, the term of this patent is extended or adjusted under 35 U.S.C. 154(b) by 1763 days.

(21) Appl. No.: 11/675,926

(22) Filed: Feb. 16, 2007

(65) Prior Publication Data

US 2008/0197884 A1 Aug. 21, 2008

(51) Int. Cl.
*H04B 15/00* (2006.01)
*H02B 1/00* (2006.01)

(52) U.S. Cl. ........ 381/94.5; 381/123; 381/118; 381/120

(58) Field of Classification Search ................. 381/94.5, 381/93, 83, 118, 120, 123
See application file for complete search history.

(56) References Cited

U.S. PATENT DOCUMENTS 4,151,471 A 4/1979 Packard et al.
4,905,290 A 2/1990 Yaoita

FOREIGN PATENT DOCUMENTS

| | | | |
|---|---|---|---|
| GB | 2003002 | | 2/1979 |
| JP | 4-326207 | A | 11/1992 |
| JP | 6-334459 | A | 12/1994 |
| JP | 08-223684 | | 8/1996 |
| JP | 9-121146 | A | 5/1997 |
| JP | 2003-304132 | A | 10/2003 |

OTHER PUBLICATIONS

International Search Report and Written Opinion in Application No. PCT/US2008/053942, dated Jul. 14, 2008.
JP OA dated Dec. 20, 2010 for JP Appln. No. 2009-524029.
International Preliminary Report on Patentability dated Aug. 27, 2009 for Appl. No. PCT/US08/053942.
First Office Action dated Feb. 29, 2012 for CN Application No. 200880000395.8.

*Primary Examiner* — Xu Mei

(57) ABSTRACT

Feedback is reduced by routing an input signal through a kick gate that opens for a predetermined time period then closes. The gate may be kept closed for a predetermined minimum time period before being allowed to open again. The gate is triggered open based on the input signal and may include a plurality of triggering conditions.

17 Claims, 4 Drawing Sheets

KICK GATE

BACKGROUND OF THE INVENTION

The present invention relates to feedback reduction in amplified percussion instruments.

Live musical performances usually require amplification of an acoustic source such as, for example, a voice or musical instrument. An electro-acoustic transducer such as, for example, a microphone converts an acoustic signal generated by the acoustic source into an electrical signal, which is amplified. The amplified electrical signal is played over one or more loudspeakers for the enjoyment of an audience. Larger audiences usually require greater amplification of the acoustic signal. As the amplification increases, however, the possibility of unwanted feedback increases and may limit the amount of amplification that can be applied. This, in turn, limits the size of the audience. Therefore, there remains a need for systems and methods that allow for large amplification of the acoustic source while reducing unwanted feedback.

SUMMARY OF THE INVENTION

Feedback is reduced by routing an input signal through a kick gate that opens for a predetermined time period then closes. The gate may be kept closed for a predetermined minimum time period before being allowed to open again. The gate is triggered open based on the input signal and may include a plurality of triggering conditions.

Implementations may include one or more of the following features. One embodiment of the present invention is directed to a kick gate comprising: a gate amplifier receiving an input signal through an input port, the gate amplifier transmitting the input signal when open and blocking the input signal when closed; and a trigger module, the trigger module including at least one trigger receiving the input signal, the trigger module opening the gate amplifier based on the input signal, wherein the gate amplifier is opened based on the input signal and closed after a predetermined period. In one aspect, the kick gate further comprising a delay module between the input port and the gate amplifier, the delay module delaying the input signal provided to the gate amplifier by a predetermined period. In one aspect, the at least one trigger is a context trigger. In one aspect, the at least one trigger further includes a snap trigger. In one aspect, the gate is opened upon activation of both the context trigger and the snap trigger. In one aspect, the gate is opened when the context trigger and the snap trigger are activated within a predetermined activation interval. In one aspect, the at least one trigger is based, in part, on a characteristic of a musical instrument generating the input signal. In one aspect, the kick gate further comprises a gain profile generator, the gain profile generator controlling a gain of the gate amplifier with a gain profile. In one aspect, the gain profile generator opens the gate for a predetermined period. In one aspect, the gain profile further includes a zero-crossing window following the predetermined period when the transmitted input signal is non-zero at the end of the predetermined period. In one aspect, the gain profile further includes a decreasing gain period following the zero-crossing window if the gate is still open. In one aspect, the gain profile includes a dead time period following the closure of the gate.

Another embodiment of the present invention is directed to a method for reducing feedback comprising: receiving an input signal; opening a kick gate based on the input signal; passing the input signal through the open gate to an output while the gate is opened; and closing the gate after a predetermined time. In one aspect, the method further comprising keeping the gate closed for a predetermined period after the gate is closed. In one aspect, the step of closing further comprises closing the gate when the input signal crosses a zero within a predetermined zero-crossing period. In one aspect, the step of closing further comprises closing the gate at a selectable rate. In one aspect, the step of opening the gate further comprises triggering the gate to open based on the input signal. In one aspect, the step of triggering is based on a rapidly rising input signal. In one aspect, the step of triggering is based on a filtered portion of the input signal. In one aspect, the step of triggering is based on an averaged portion of the input signal. In one aspect, the step of triggering the gate to open is based on a characteristic of a musical instrument generating the input signal.

Another embodiment of the present invention is directed to a method for reducing feedback comprising: receiving an input signal; delaying the input signal; opening a kick gate based on the input signal; passing the delayed input signal through the open gate to an output while the gate is opened; and closing the gate after a predetermined time.

Another embodiment of the present invention is directed to a method of reducing feedback comprising: providing a gate, the gate receiving an input signal from an electro-acoustic transducer and generating an output signal to a power amplifier; opening the gate based on the input signal; and closing the gate after a predetermined time period.

BRIEF DESCRIPTION OF THE DRAWINGS

In the drawings, like reference numbers refer to like structures.

DETAILED DESCRIPTION

Figure 1:
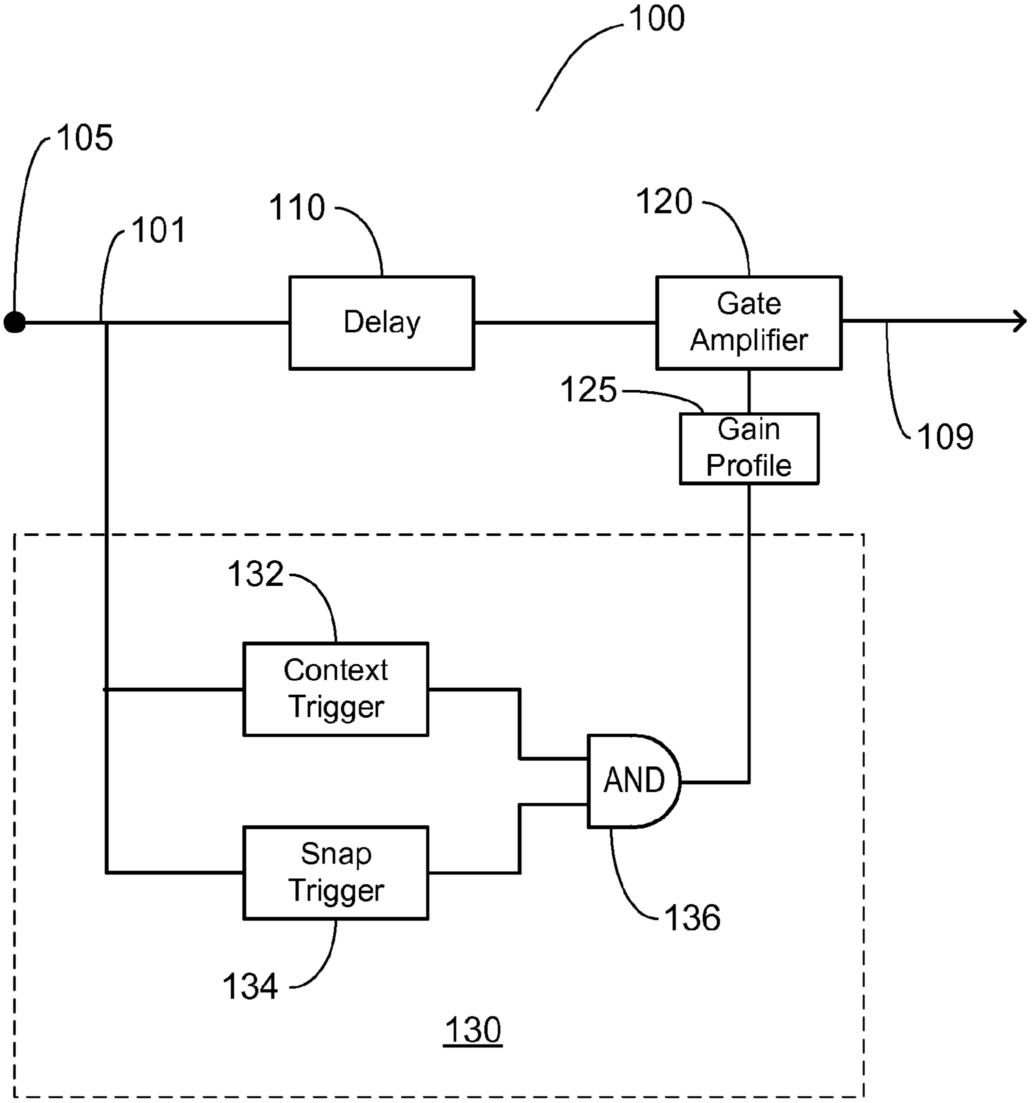
FIG. 1 is a block diagram illustrating an embodiment of the present invention.

FIG. 1 is a block diagram illustrating an embodiment of a kick gate 100. In FIG. 1, an input signal 101 is received through an input port 105 and is passed through an optional delay module 110, then into a gate amplifier 120 before being output as an output signal 109. The input signal 101 may be generated by an electro-acoustic transducer such as, for example, a microphone that converts an incoming acoustic signal to an electrical input signal 101. The output signal 109 may be amplified by a power amplifier (not shown) and converted to an acoustic signal by a speaker (not shown). The delay module 110 compensates for the speed of the kick gate's electronics in processing the input signal and determining whether or not to open the kick gate. If the kick gate's electronics are sufficiently fast to process the input signal such that an audience does not perceive the deletion of the earliest part of the signal preceding activation of trigger module 130, the delay module 110 may be removed from the kick gate.

Gate amplifier 120 amplifies the delayed input signal according to a gain profile generated in a gain profile generator 125. The gate amplifier 120 sends the amplified signal as output signal 109. The gain profile determines the amount of amplification applied by the gate amplifier 120 to the delayed input signal. When the gain is set to zero, the output signal 109 is zero and none of the input signal 101 is passed to output signal 109. When the gain is set to 1, the input signal 101 is passed unattenuated to the output signal 109. The gain may be set to any value to amplify (gain greater than 1) or to attenuate (gain less than 1) the input signal 101. The gain profile may be a function of time that can be set to any desired shape that may be a pre-determined function over a finite interval of time. For example, the gain profile may be a unit square pulse. When the square pulse has a value of zero, the input signal 101 is blocked from reaching the output and when the square pulse has a value of 1, the input signal 101 is passed unattenuated through to the output signal 109. In this way, the gate amplifier 120 acts as an open gate that allows the input signal 101 through when the pulse is 1 and as a closed gate that blocks the input signal 101 when the pulse is 0. Blocking the input signal disrupts any feedback loop that may be created when portions of the amplified output signal 109 are fed back into the input signal 101. A gain of exactly zero is not required for the operation of the kick gate 100 and a small gain value may be applied that effectively closes the gate by reducing the output signal to a level sufficient to prevent an unwanted feedback loop. As used hereinafter, a closed gate refers to a situation where the input signal has been sufficiently attenuated to prevent an unwanted feedback loop and a zero gain value includes a range of gain values that sufficiently attenuates the input signal to prevent an unwanted feedback loop.

A feedback loop may be created, for example, when using amplified musical instruments. In a typical configuration using amplified musical instruments, an electro-acoustic transducer such as, for example, a microphone is placed in close proximity to an acoustic source such as, for example, a musical instrument or voice. The microphone converts the acoustic signal generated by the acoustic source into an electrical signal that is amplified by a power amplifier. The amplified electrical signal is sent to another electro-acoustic transducer such as, for example, a speaker that converts the amplified electrical signal into an amplified acoustic signal directed into a listening volume that contains an audience. The microphone is usually inside the listening volume and can sense the amplified acoustic signal generated by the speaker. The amplified acoustic signal sensed by the microphone is undesired and creates the unwanted feedback loop by amplifying the sensed amplified acoustic signal repeatedly. Feedback can be eliminated by disrupting the feedback loop anywhere along the microphone-amplifier-speaker loop. The kick gate is inserted between the microphone and power amplifier in the feedback loop and severs the feedback loop when the gate is closed.

The opening and closing of the gate is determined by a trigger module 130. The trigger module 130 may include one or more triggers that implement different criteria for opening the gate. A trigger may be vulnerable to a particular type of false positive condition wherein the trigger is activated when it should not be activated. When activated, the trigger changes its output state to signal downstream modules such as, for example, AND gate 136 or gain profile generator 125 that its triggering condition has been realized. This could result in the gate opening when it should remain closed. Using multiple triggers with different triggering criteria may reduce the rate where the gate is incorrectly opened.

In FIG. 1, the trigger module 130 includes a context trigger 132 and a snap trigger 134. An AND gate 136 opens the kick gate 100 only when both the energy and snap triggers are triggered. The snap trigger 134 may be a simple threshold trigger that opens the kick gate 100 when, for example, the input signal 101 exceeds a predetermined threshold value. The threshold value may depend on the particular acoustic setup and may be determined by adjusting the threshold such that the snap trigger is activated when desired. The snap trigger 101, however, tends to be more vulnerable to false positives when the acoustic environment is relatively quiet and the threshold value is relatively low. The snap trigger 134 may also have a high false positive rate when the acoustic environment is relatively noisy compared to an expected triggering signal. When the acoustic environment is relatively quiet and the threshold is relatively low, an extraneous sound may be sufficient to activate the snap trigger. Similarly, in a noisy environment where the noise fluctuations are comparable to a triggering signal, the snap trigger may incorrectly activate on the noise fluctuations.

A context trigger 132 is based on an absolute value of the input signal 101 compared to a running averaged absolute value of the input signal 101. The context trigger 132 is activated when the instant absolute value of the input signal 101 exceeds the most recent average of the absolute value of the input signal by a pre-determined rising threshold value. Comparing the instant absolute value of the input signal to a recent average and tends to average out the noise fluctuations in the input signal. The relatively higher discrimination of noise fluctuations provided by the context trigger can compensate for a portion of the false positives generated by the snap trigger.

Further discrimination against false positives may be accomplished by operating the AND gate 136 over a predetermined temporal window. Using a temporal window increases the likelihood that each trigger was triggered by the same event. In some embodiments, the AND gate 136 may be configured to trigger only when the signals from the snap trigger 134 and the context trigger 132 arrive at the AND gate 136 within a predetermined time interval of each other. The predetermined time period may depend on the characteristics of the specific musical instrument. For example, in a configuration with a kick drum, the predetermined temporal window may be set between 0 and 50 ms, preferably between 0 and 10 ms, and more preferably between 1 and 4 ms.

The output of the AND gate 136 is sent to the gain profile generator 125. In some embodiments, the gain profile generator 125 sets the gain of the gate amplifier 120 to zero such that the kick gate 100 is closed in its initial state. When the gain profile generator 125 receives a trigger from the AND gate 136, a pre-determined gain profile is generated and applied over time to the gate amplifier 120. The gain profile generator may be as simple as a square pulse generator but more complicated gain profiles may be generated. Alternatively, the gain profile generator may retrieve the pre-determined gain profile from a memory.

Figure 2:
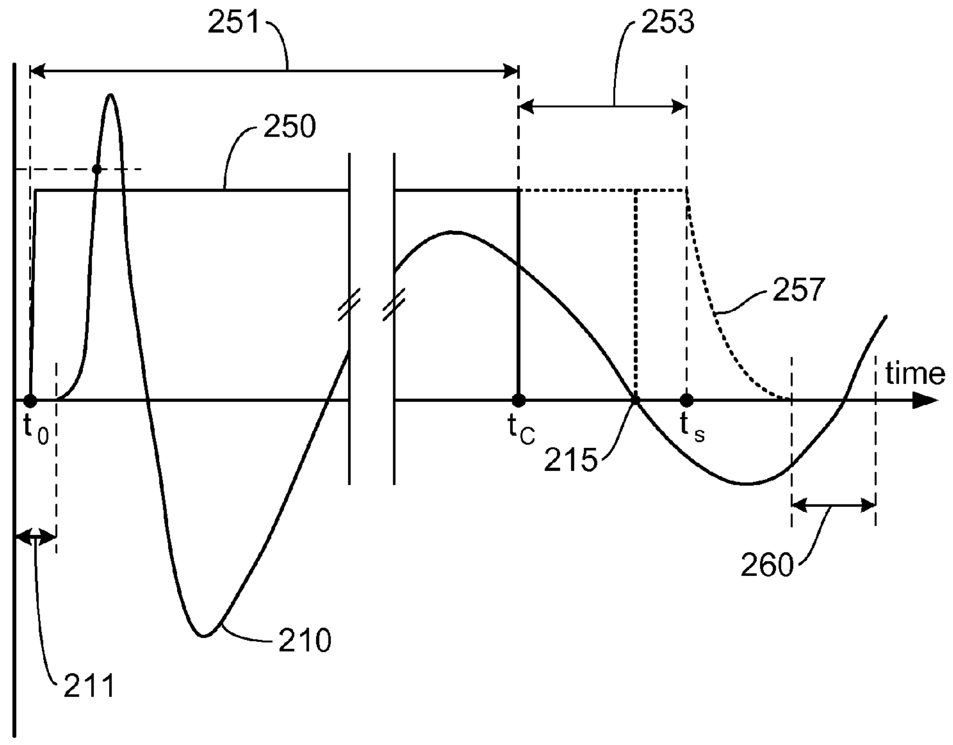
FIG. 2 is a time series illustrating an exemplar input signal and a gain profile used in the embodiment of FIG. 1.

FIG. 2 is a time series illustrating an exemplar input signal and a gain profile. FIG. 2 shows an exemplar delayed input signal 210 seen by the gate amplifier 120 and a gain profile 250 applied to the gate amplifier 120. The delay added by delay module 110 is indicated in FIG. 2 by offset 211. The delay allows the trigger module 130 to process the input signals before the input signal reaches the gate amplifier 120. The delay is a predetermined time period that compensates for the speed of the kick gate's electronics and the audience's ability to perceive the deletion of the earliest part of the signal preceding activation of the trigger module. The predetermined time period is preferably less than 10 ms and more preferably less than about 1 ms.

In FIG. 2, the kick gate is triggered opened at to indicated by the change in the gain profile 250 from 0 to 1. The kick gate is opened at a pre-determined opening rate that reduces perceptible artifacts arising from the opening of the gate. If the kick gate is opened at a slow rate, an initial portion of the signal may be missed. If the kick gate is opened at a very fast rate, an audible "pop" may be perceived. The pre-determined opening rate is preferably set within a range from 2 dB/ms to 10 dB/ms and more preferably set within a range from 5 dB/ms to 7 dB/ms.

When the kick gate is triggered open, the kick gate remains open for a predetermined open period 251. While the kick gate is open, the delayed input signal 210 is passed through the kick gate. The gain applied to the delayed input signal 210 may a value other than 1 to compensate for any attenuation from the delay module or to provide pre-amplification of the input signal prior to the power amplifier.

Open period 251 may be adjusted to the specific musical instrument being amplified. For example, in an amplified kick drum configuration, the open period is preferably between 10 ms and 100 ms and more preferably between 20 ms and 50 ms.

In some embodiments, the open period 251 where the kick gate remains opened may be optionally followed by a zero-crossing window 253. The zero-crossing window 253 can prevent the introduction of transient artifacts arising when the gate closes when the delayed input signal has a non-zero value. For example, in FIG. 2 at the end of the open period 251, indicated by $t_C$, the delayed input signal 210 has a non-zero value. The closure of the kick gate at $t_C$ could create an audible acoustic artifact. When a zero-crossing window is used in the kick gate, the kick gate remains open until the delayed input signal 210 crosses a zero indicated in FIG. 2 by point 215. At point 215, the input signal has a zero value and the kick gate can be closed without creating an unwanted acoustic artifact. The zero-crossing window is preferably less than 50 ms and more preferably between 5 ms and 25 ms.

If, at the end of the zero-crossing window, the delayed input signal has not crossed a zero, the kick gate is closed by decreasing the gain to a zero value at a user adjustable closure rate as illustrated in FIG. 2 by line 257. In some embodiments, the gate closure rate may be adjusted by the user to allow, for example, a drum to "ring" at a relatively slow closure rate or to "tighten" the drum at a relatively fast closure rate. The user adjustable closure rate is preferably between 0.1 dB/ms and 2 dB/ms. The user adjustable closure rate is used when closing the gate at a zero-crossing point or at the end of the zero-crossing window, indicated by point ts in FIG. 2. The decreasing gain profile as the kick gate closes tends to reduce the harshness of any acoustic artifact resulting from the kick gate closure.

In some embodiments, the kick gate may be kept shut for a predetermined dead time after the kick gate is closed as indicated in FIG. 2 by interval 260. During the dead time interval the kick gate remains closed regardless of state of the trigger module 130. Keeping the kick gate closed for a predetermined interval assists in counteracting the effect of false positives from the trigger module. If the trigger module does not generate a lot of false positives, the dead time interval may be removed. After the passage of the dead time interval, the kick gate remains closed but may be triggered open by the trigger module 130. The dead time depends on, among other things, the acoustic characteristics of the musical instrument being amplified and the tempo of the music. The dead time may be a preselected value or may be user adjustable. For example, in a kick drum configuration, the dead time is preferably between 10 ms and 250 ms and more preferably the same as the open period 251.

Figure 3:
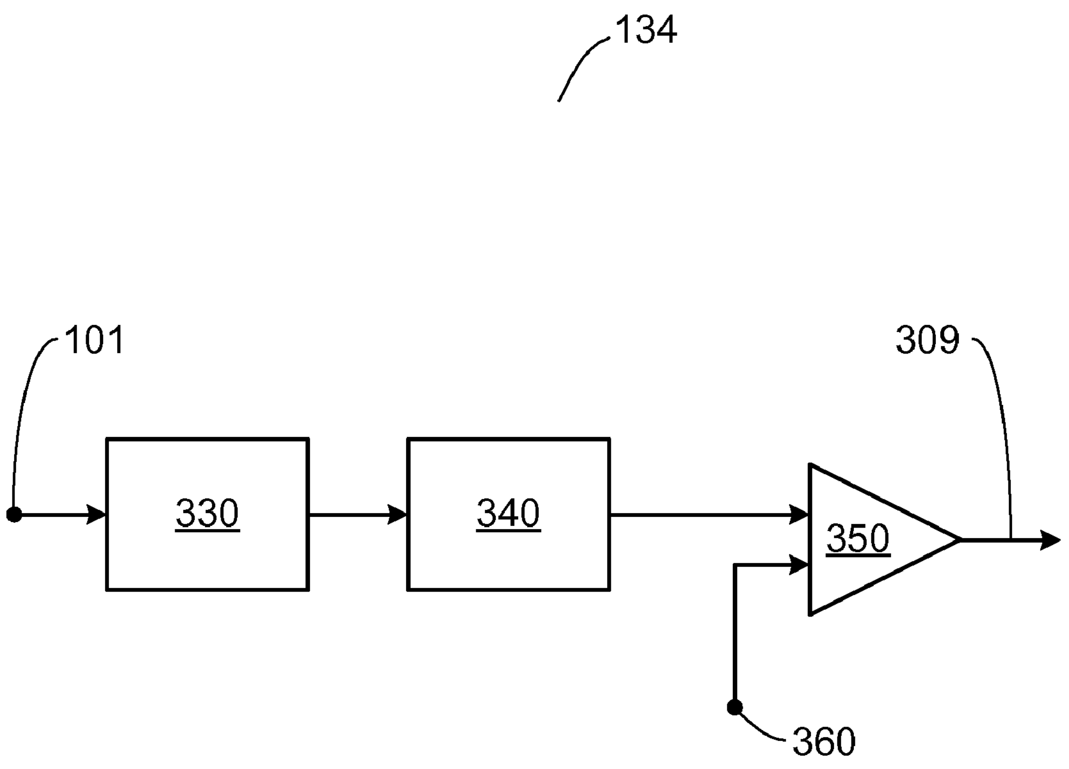
FIG. 3 is a block diagram of a snap trigger used in FIG. 1.

FIG. 3 is a block diagram of a snap trigger 134. In FIG. 3, input signal 101 is applied to filter 330. The filter may be a low-pass, high-pass, or band-pass filter. The type and parameters of filter 330 may be determined by one or more characteristics of the musical instrument generating the input signal 101. For example, for a percussive instrument, the frequency band location and band width may be selected to capture the initial strike of the instrument. In some embodiments, filter 330 may be a fourth-order low pass filter with a cutoff frequency between 2 kHz and 6 kHz. A lower or higher order filter may be used depending on level of discrimination desired for the initial strike. The cutoff frequency may be adjusted to the specific instrument being struck.

Module 340 receives the filtered signal and takes the absolute value of the filtered signal and comparator 350 compares that signal against a predetermined threshold value 360. If the signal received by comparator 350 exceeds the predetermined threshold value 360, the snap trigger is activated and sends a triggering signal 309 to the AND gate if more than one trigger is used or directly to the gain profile generator if trigger module only includes the snap trigger. The threshold value 360 may be preset initially or user adjustable and depends inter alia on the specific musical instrument and microphone configuration as well as the ambient acoustic environment. Determination of the threshold value may be done in conjunction with the selection of the filter parameters to reduce the occurrences of false triggerings by the snap trigger while capturing the actual strikes of the instrument.

Figure 4:
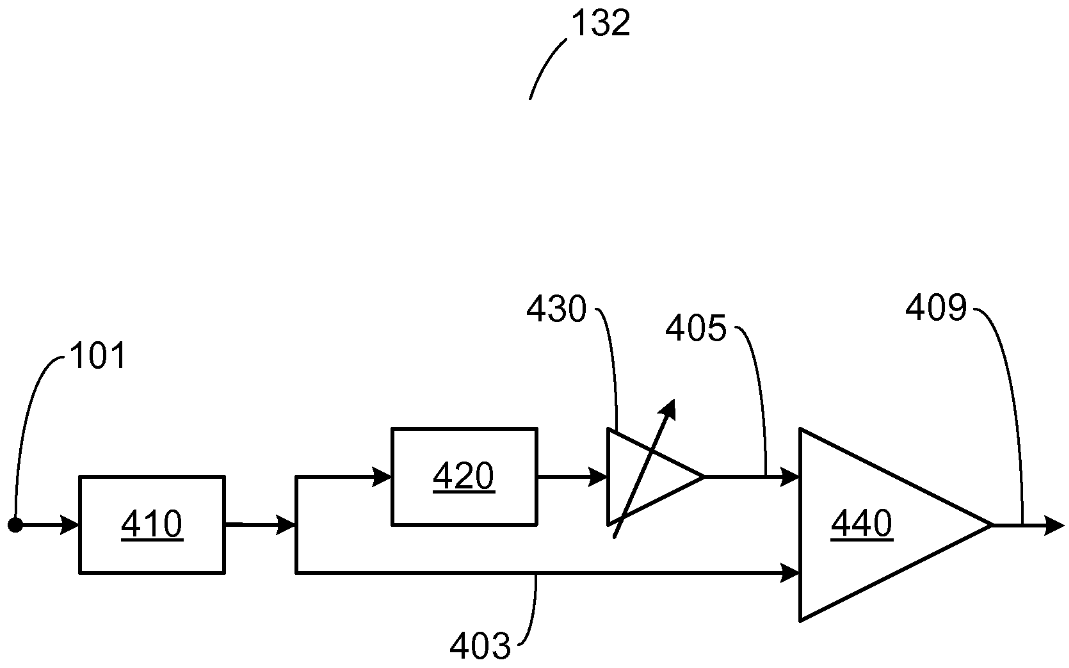
FIG. 4 is a block diagram of an context trigger used in FIG. 1.

FIG. 4 is a block diagram of a context trigger 132. In FIG. 4, input signal 101 is applied to a filter 410 that generates a context signal by taking the absolute value of the input signal. Context signal 403 is applied to an input of comparator 440 and to an averaging filter 420. The averaging filter 420 generates a running average of the context signal and may be implemented as, for example, a low pass filter. Parameters for the averaging filter may be selected to provide an averaging time period sufficient to establish a representative noise level around the microphone generating the input signal, but responsive to sound level of the instrument's performance. In some embodiments, the averaging filter may be a fourth-order low pass filter having a cutoff frequency between 5 Hz and 30 Hz and more preferably between 10 Hz and 20 Hz. In some embodiment, the averaging filter may be a second-order low pass filter having a cutoff frequency between 2 Hz and 10 Hz. The averaged signal represents a "baseline" level of the acoustic environment around the microphone generating the input signal.

The averaged signal is amplified by a variable gain amplifier 430. The gain applied by the variable gain amplifier to the averaged signal represents a threshold factor that the context signal must exceed over the averaged signal before the context trigger is activated and approximates a signal-to-noise ratio required to activate the context trigger. The gain threshold factor and the averaging filter parameters may be selected in conjunction to discriminate against false positives while correctly activating the context trigger in response to an actual instrument strike. In some embodiments a user adjustable control may be provided to allow the user to adjust the gain threshold factor for the context filter. In some embodiments, the user adjustable control may be used to control both the gain threshold factor for the context filter and the threshold value of the snap trigger in a proportional manner.

The amplified averaged signal 405 is applied to a second input of comparator 440. Comparator 440 compares context signal 403 against amplified averaged signal 405 and outputs a trigger signal 409 when the context signal 403 exceeds the amplified averaged signal 405. When the context signal rises slowly relative to an averaging time of the averaging filter, the averaged signal also increases such that the slowly rising context signal does not exceed the threshold factor for the context trigger. Conversely, when the context signal rises rapidly relative to the averaging time of the averaging filter, the context signal may exceed the averaged signal by the threshold factor and activate the context trigger. By comparing the context signal to the amplified averaged signal, the context trigger accounts for the loudness of the music to adjust the threshold for activating the context trigger. In other words, during a relatively quiet portion of a musical performance, a soft strike can activate the context trigger but during a loud portion of the musical performance, the same soft strike may not activate the context trigger.

The context trigger 132 tends to produce less false positives in quiet environments than the snap trigger 134. In some embodiments, the context trigger 132 may be used exclusively to trigger the kick gate. In some embodiments with both the snap trigger and context trigger, the snap trigger may be disabled when the averaged energy signal is below a minimum threshold value such that the kick gate is triggered only by the context trigger. The snap trigger may be disabled by switching the output of the context trigger to both inputs of the AND gate 136. Alternatively, the output of the context trigger may be switched directly into the gain profile generator 125. The minimum threshold for switching exclusively to the context trigger may be determined by adjusting the minimum threshold such that the number of false activations of the trigger module is reduced.

Embodiments of the present invention comprise signal processing that may be implemented in hardware or software executing on a computer performing computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be execution on a variety of processors such as, for example, microprocessors, digital signal processors, gate arrays, etc. For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Having thus described at least illustrative embodiments of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed:

1. A method for reducing feedback comprising:

receiving an input signal;

opening a kick gate based on the input signal;

passing the input signal through the open gate to an output while the gate is opened; and closing the gate after a predetermined time, wherein the step of closing further comprises closing the gate when the input signal crosses a zero within a predetermined zero-crossing period.

2. The method of claim 1 further comprising keeping the gate closed for a predetermined period after the gate is closed.

3. The method of claim 1 wherein the step of opening the gate further comprises triggering the gate to open based on the input signal.

4. The method of claim 3 wherein the step of triggering is based on a rapidly rising input signal.

5. The method of claim 4 wherein the step of triggering is based on a filtered portion of the input signal.

6. The method of claim 5 wherein the step of triggering is based on an averaged portion of the input signal.

7. The method of claim 3 wherein the step of triggering the gate to open is based on a characteristic of a musical instrument generating the input signal.

8. The method of claim 1 further comprising delaying the input signal;

wherein the step of passing comprises passing the delayed input signal through the open gate to an output while the gate is opened.

9. A method for reducing feedback comprising:

receiving an input signal;

opening a kick gate based on the input signal;

passing the input signal through the open gate to an output while the gate is opened; and closing the gate after a predetermined time, wherein the step of closing further comprises closing the gate at a selectable rate.

10. The method of claim 9 wherein the step of opening the gate further comprises triggering the gate to open based on the input signal.

11. The method of claim 10 wherein the step of triggering is based on a rapidly rising input signal.

12. The method of claim 11 wherein the step of triggering is based on a filtered portion of the input signal.

13. The method of claim 12 wherein the step of triggering is based on an averaged portion of the input signal.

14. The method of claim 10 wherein the step of triggering the gate to open is based on a characteristic of a musical instrument generating the input signal.

15. The method of claim 9 further comprising delaying the input signal, wherein the step of passing comprises passing the delayed input signal through the open gate to an output while the gate is opened.

16. A method for reducing feedback comprising:

receiving an input signal;

opening a kick gate based on the input signal;

passing the input signal through the open gate to an output while the gate is opened; and closing the gate after a predetermined time, wherein the step of opening the gate further comprises triggering the gate to open based on the input signal, and wherein the step of triggering the gate to open is based on a characteristic of a musical instrument generating the input signal.

17. The method of claim 16 further comprising delaying the input signal, wherein the step of passing comprises passing the delayed input signal through the open gate to an output while the gate is opened.

* * * * *